Patented Dec. 28, 1943

2,337,939

UNITED STATES PATENT OFFICE 2,337,939

HEAT-SEALING MOISTUREPROOFING COATING

John P. Sermattei, Minneapolis, Minn.

No Drawing. Application February 19, 1940, Serial No. 319,684

12 Claims. (Cl. 117—66)

This invention relates to heat sealing, moisture-proofing, coating and impregnating compositions for use on paper and other sheet materials, and to coated and impregnated products made therefrom.

An object of the invention is to provide a coating which may be applied in a molten state and which possesses the characteristics and advantages of lacquer coatings, soft or moisture-proof wax coatings and hard wax coatings and which eliminates the disadvantages of these particular coatings where separately used.

A particular object is to provide a coating which develops a higher gloss and better transparency than the ordinary lacquer coatings, that is possessed of superior moisture-proofing qualities and to provide a coating composition that combines these properties with improved heat sealing characteristics and which can be effectively used to wrap products of high moisture content such as bread without developing the buckling, sogginess and loss of gloss characteristics.

Paraffin wax has long been used as a moisture-proofing coating and impregnating material for use on paper, and so far as moisture-proofness is concerned, it gives fairly satisfactory results. In addition to affording satisfactory protection against moisture loss, paraffin has the advantage of low cost and of permitting application from the molten state without the use of solvents; thus eliminating the fire hazards, costs and drying problems that are involved where coatings that are applied from solution in organic solvents are used. Paraffin coatings, however, though widely used, suffer from a number of defects, chief of which are their tendency to smear, their relatively poor gloss and transparency, their low heat sealing strength and their brittleness, which greatly reduces their moisture-proofness under conditions of actual use where a certain amount of handling and crumpling of the sheet is unavoidable.

Thus, such a waxed paper which, according to the test described later in this specification, transmits 100 grams or less water vapor through 10,000 square inches per 24 hours at 85 degrees F. in its initial uncrumpled state, will transmit, after crumpling in the palm of the hand, 700 to 3000 grams of water vapor under the same test conditions, the exact amount depending on the weight of the wax coating, the type of paper and other factors.

Moreover, when used on glassine, paraffin has never given a sheet which was satisfactory for use as a bread wrap, despite the fact that such a wrap is desired, because of its much better transparency compared to other types of waxed papers. Despite its good moisture-proofness, waxed glassine, when used on a product of high moisture content such as bread, soon loses its initial gloss and transparency and quickly becomes badly buckled and soggy, destroying entirely the initial attractiveness of the wrap. This appears to be due to readiness with which glassine swells and shrinks under varying moisture contents, and to the lack of sufficient film strength and flexibility in the wax coating to keep the coating intact under the dimensional changes which the paper undergoes.

More recently, nitro cellulose lacquers containing a minor amount of wax have appeared on the market and these have found some application as a moistureproof coating for use on glassine and other types of paper. Lacquer coated glassine possesses better transparency than waxed glassine, it possesses a hard, fairly glossy surface that is non-smearing and, while its initial moisture-proofness is not as good as a waxed glassine, its crumpled moisture-proofness is considerably better, so that its overall protective qualities are on the whole only slightly inferior to waxed glassine. Moreover, with certain types of lacquer, a coating having strong heat sealing properties can be obtained and this can be done without sacrifice of the good non-blocking properties possessed by a lacquer coating. Furthermore, lacquer apparently has film strength and flexibility, so that a lacquer coated glassine can be used on bread without developing the sogginess, haziness and loss of luster that occur where a waxed glassine is used. The lacquer coating does not prevent the buckling or distortion of the glassine when used on bread, but it apparently accommodates itself to these dimensional changes so that, except for the buckling, the type of failure given by waxed glassine under these conditions does not occur.

Lacquer coated glassine is thus a generally superior wrap to waxed glassine for many purposes, and it has found some application, but its high cost, the fire hazards involved in the use of lacquer and the need of expensive drying equipment to eliminate the solvents have retarded its more widespread use.

The coating compositions of the present invention combine the excellent film characteristics of lacquer coatings with the low cost and freedom from drying problems characteristic of wax coatings. A chief object of this invention, therefore, is to provide coating compositions which can be applied in the molten state similar to a wax coating and which, at the same time, possess the hardness, toughness, flexibility, non-smearing, non-tacky, non-blocking and the good surface slip characteristics of a lacquer coating.

A further object is to provide a coating composition which can be applied from the molten state without the use of solvents and, which, when applied to a glassine type of paper, develops higher gloss and better transparency than a lacquer coating and at much less cost.

A still further object is to provide a coating composition that combines the above properties with moistureproofing properties, both initially and after crumpling, that are as good or better than those given by a good nitro cellulose lacquer containing a minor proportion of wax.

Still another object is to provide a coating composition that combines the above properties with good heat sealing characteristics.

Still another object is to provide coating compositions which, when applied to a glassine type of paper, give a moistureproof and heat sealing sheet, which can be used to wrap products of high moisture content, such as bread, without developing the buckling, haziness, sogginess and loss of gloss, characteristic of a waxed glassine under the same conditions of use.

Other objects will appear from the following description and the appended claims.

For the purposes of this specification and claims, we define a moistureproof coating as one which when applied to one side of a glassine paper at a coating weight not exceeding 3.0 lbs. per ream (2880 sq. ft.) reduces the moisture vapor transmission to 500 grams or less per 10,000 square inches per 24 hrs. at a temperature of 85 degrees F. and at the relative humidity differential obtained by maintaining a relative humidity of 100% on the coated side of the sheet and a relative humidity of 15% on the uncoated side. Plain, uncoated glassine will, under these test conditions, transmit about 5,500 grams of water vapor per 10,000 square inches per 24 hrs. It will be understood that this definition represents a minimum moistureproof value; compositions formulated according to the teachings of this invention, when applied to one side of a glassine paper, are capable in many cases of reducing the moisture vapor transmission value to 100, 50 and even less grams of water per 24 hrs. per 10,000 square inches under the temperature and humidity conditions stated above. When a glassine paper is coated on both sides, the moisture loss value is ordinarily about one half that obtained when one side only is coated, if the same composition at the same coating weight that is on the first side is applied to the second side.

The coating compositions of this invention are also truly heat sealable, and for the purpose of this specification and claims, we define this as follows:

By heat sealable, we mean that two strips of glassine paper, two inches in width, having a coating weight not exceeding 3.0 lbs. per side per ream, and sealed together by the application of heat and pressure in the manner described below, will require a force of at least 20 grams to pull them apart when the end of one strip is attached to a device which indicates the pull, and the same end of the other strip is held in the hand and slowly drawn away until the bond is ruptured. The reading on the instrument for measuring the pull is recorded at this point, and the test repeated a number of times in order to get a good average value. For the purposes of this test, the seal is made by superposing the two strips of coated paper upon each other, placing them on a brass plate heated to a temperature between 250 degrees and 350 degrees F., usually about 300 degrees F., and pressing them together by running a rubber roll rather slowly over the strips three times. This rubber roll is the same width as the paper strips and, in order to exert a uniform pressure, a weight of 250 grams is mounted directly over the roll, and no additional pressure is exerted by the operator making the test.

The value of 20 grams is about the strength of bond given by a waxed glassine and represents a minimum sealing strength for the coating compositions of this invention, which in many cases can be made to give seals withstanding 50, 100, 150 grams and even greater pulls on a strip 2 inches wide. The sealing strength obtained with any given coating composition in this test depends to some extent upon the moisture content of the glassine paper; a soft, well humidified sheet, giving generally higher values than a paper that is low in moisture content, and as a result is rather brittle and of low tearing strength. The values given above refer to results obtained on a sheet having a sufficient moisture content for commercial wrapping purposes, this moisture content being in the range 4–8%.

The moistureproofing and heat sealing compositions of this invention are compounded by fusing together, at a temperature of about 300 degrees F. a hard wax, a moistureproofing wax, a cellulose ether such as ethyl or benzyl cellulose and preferably although not necessarily, a resin. The waxes and resins are preferably melted together first and brought to a temperature of 250 degrees to 325 degrees F., and then the cellulose ether added and the mixture stirred continuously until complete solution and a clear melt results. The heating is done, preferably, over a wax or oil bath, or in a steam jacketed kettle to prevent any localized overheating that might result if a free flame were used.

It is preferable not to exceed a temperature of 325 degrees F., although in occasional formulas, where the viscosity is high, temperatures up to 400 degrees F. may be used. The waxes and resins dissolve together as soon as melted, but the cellulose ether requires 1 to 6 hours to completely dissolve, this time depending on the viscosity, temperature and stirring efficiency.

The hard wax may be either a vegetable, animal or synthetic wax, but I prefer to use Opal wax (a hydrogenated vegetable wax manufactured by E. I. du Pont de Nemours and Company) because compositions containing it give definitely better moisture-proofness than when other waxes are used. Albacer (a synthetic wax made by Glyco Products Company, Brooklyn, N. Y. "Hydrogenated polyhydric alcohol ester of vegetable oils") can also be used and also gives quite good results, but other waxes tried were found to be inferior to these two when substituted for either Opal wax or Albacer in these compositions. However, when used together with Opal wax, candelilla, and Glyco wax B430 (a hard, brittle light colored synthetic wax made by Glyco Products Company, Brooklyn, N. Y.) were found to give quite satisfactory results. The hard wax used is preferably one which in the molten state is a solvent for cellulose ethers, and it gives the coatings their hardness and gloss and, in cooperation with the other ingredients, develops the moistureproofing and heat sealing qualities.

The moistureproofing wax is preferably spermaceti. This wax in these compositions is definitely superior to all other waxes tested, including paraffin, which according to the prior art, is supposed to be the best moistureproofing wax available. While this may be true in lacquers and in hot melts of other types, in the compositions of this invention, paraffin gives very inferior moistureproofness when used in place of spermaceti, and also definitely detracts from the moistureproofness when used in addition to the spermaceti. In fact, in these compositions the high degree of moistureproofness achieved would be unattainable without the use of spermaceti, which appears to be unique in its property of conferring high moistureproofness in molten compositions containing a cellulose ether. In these compositions I have found that paraffin is comparatively ineffective as a moistureproofing agent and one of the chief discoveries of this invention resides in the development of a method of imparting high moistureproof qualities to molten coating compositions containing substantial amounts of a cellulose ether, a constituent which is essential for good hardness, toughness, flexibility and heat sealability of the final coating. In addition to its moistureproofing action, it should be noted that spermaceti also has a plasticizing effect and contributes to the flexibility and heat sealing properties of the finished coating.

For the cellulose ether, I prefer to use ethyl cellulose, although other cellulose ethers such as benzyl cellulose can also be used. The ethyl cellulose is the commercially available grade which contains 2.4 and 2.5 ethoxy groups per glucose residue and possesses good solubility in molten waxes and resins. Either the high, medium, low or extra low viscosity types can be used, but I prefer the low viscosity grade as giving generally superior results. The low viscosity type is defined as having a viscosity of 24 to 28 centipoises when measured in a 5% solution in a solvent mixture of 80% toluene and 20% alcohol in a capillary viscometer at 25 degrees C.

A resin is not an essential ingredient of these compositions, as quite satisfactory coatings can be obtained with compositions comprising only hard wax, spermaceti and ethyl cellulose. The use of a resin is desirable, however, for in proper amounts it increases the toughness and flexibility of the coatings and thus improves their heat sealing and crumpled moistureproof qualities. However, if the resin content exceeds the limits given later in this specification, the coatings show a tendency to become tacky, their blocking resistance is thereby reduced and, moreover, there is a considerable diminution in moistureproofness. The resin content must therefore be rather carefully adjusted with these factors in mind.

For the resin I prefer to use hydrogenated ester gum because of its good stability particularly against oxidation on aging in the film and also because of its good color and almost complete lack of odor. However, many other resins of various types can be used. Thus, the following resins have all been tried and found to give satisfactory results: ester gum, damar, Neville R-7, Neville R-8, Neville R-9, Neville R-13, (Nevilles R-7, R-8, R-9, R-13 are resins of the coumarone-indene type, manufactured by the Neville Co., Pittsburgh, Pa.) Nevillite, (Nevillite is a cycloparaffine or naphthene polymer type of resin manufactured by the Neville Co., Pittsburgh, Pa.) Paranol Hard #1, Paranol Extra Hard #1, Paranol 2924B (Paranol Hard #1, Paranol Extra Hard #1 and Paranol 2924B are phenol formaldehyde modified ester gums manufactured by the Paramet Chemical Co., Long Island City, N. Y.) P88 resin (P88 resin is manufactured by Reichold Chemicals, Detroit, Michigan) Arochlor 5460 (Arochlor 5460 is a chlorinated diphenyl type of resin manufactured by the Monsanto Chemicals Co., St. Louis, Mo.) Teglac 15 (Teglac 15 is a modified alkyd type of resin manufactured by the American Cyanamid Co., New York city). Arolite 545 (Arolite 545 is a modified maleic type of resin manufactured by Stroock & Wittenberg Corp., New York city). Phenac 6ssM (Phenac 633M is a modified Phenol formaldehyde type of resin manufactured by the American Cyanamid Co., New York city). In addition to these, there are undoubtedly many other resins of the above or other types that can also be used.

The preferred and limiting proportions of these various ingredients are given in the table below, the figures denoting percentages by weight.

|  | Preferred range | Operative range |
|---|---|---|
| Hard wax | 30-50 | 15-75 |
| Spermaceti | 10-30 | 2-50 |
| Resin | 0-30 | 0-50 |
| Ethyl cellulose | 14-22 | 5-30 |

These proportions are fixed by consideration of a number of factors. Thus, the ethyl cellulose is fixed on the low side by the point at which the moistureproofness exceeds the limits given in my definition, and on the high side by the factor of viscosity. In general, it is desirable to include the maximum possible amount of ethyl cellulose, since the moistureproofness increases with increasing ethyl cellulose content, and likewise the hardness, toughness, flexibility and heat sealing strength also increase as the ethyl cellulose is increased. However, the ethyl cellulose also causes a marked increase in the viscosity of these molten compositions, and the upper limits given represent about the maximum ethyl cellulose content, compatible with a workable coating viscosity at temperatures preferably below 325 degrees F. but in some cases up to 400 degrees F.

The limits for the spermaceti content represent the range within which the best moistureproofness is achieved, and the preferred range is also determined to some extent by the plasticizing effect of the spermaceti as reflected in the heat sealing strength and crumpled moistureproof values.

Increasing the resin contents increases the toughness and the heat sealing strength and also improves the crumpled moistureproof values. The optimum resin content will depend somewhat on the particular resin used, but in general, if the limits given are exceeded, the initial moistureproof value will suffer and the tackiness and blocking of the coated papers in storage will increase. The limits given for the resin thus represent the range within which the best combination of moistureproofness, sealing strength and non-blocking properties are obtained.

In order to more clearly describe this invention, a number of specific examples will now be given which, it will be understood, are illustrative only and not limitative, for many other embodiments are possible according to the teachings of this disclosure:

Example 1

| | Per cent by weight |
|---|---|
| Opal wax | 40 |
| Hydrogenated ester gum | 20 |
| Spermaceti | 20 |
| Ethyl cellulose (low viscosity) | 20 |
| | 100 |

Example 2

| | Per cent by weight |
|---|---|
| Albacer wax | 40 |
| Hydrogenated ester gum | 25 |
| Spermaceti | 20 |
| Ethyl cellulose (low viscosity) | 15 |
| | 100 |

Example 3

| | Per cent by weight |
|---|---|
| Opal wax | 34 |
| Hydrogenated ester gum | 25 |
| Spermaceti | 25 |
| Ethyl cellulose (low viscosity) | 16 |
| | 100 |

Example 4

| | Per cent by weight |
|---|---|
| Opal wax | 50 |
| Spermaceti | 30 |
| Ethyl cellulose (low viscosity) | 20 |
| | 100 |

Example 5

| | Per cent by weight |
|---|---|
| Opal wax | 42 |
| Spermaceti | 30 |
| Hydrogenated ester gum | 10 |
| Ethyl cellulose (low viscosity) | 18 |
| | 100 |

Example 6

| | Per cent by weight |
|---|---|
| Opal wax | 40 |
| Spermaceti | 20 |
| Paranol 2924B | 20 |
| Ethyl cellulose (low viscosity) | 20 |
| | 100 |

Example 7

| | Per cent by weight |
|---|---|
| Opal wax | 20 |
| Candelilla | 20 |
| Ester gum | 20 |
| Spermaceti | 20 |
| Ethyl cellulose (low viscosity) | 20 |
| | 100 |

As already mentioned, these compositions are prepared simply by melting together the waxes and resins and then adding the ethyl cellulose and stirring the molten mass until complete solution and a clear melt results. The temperature will, ordinarily, be held between 250 degrees and 325 degrees F. but in some cases, where the viscosity is particularly high, temperatures as high as 400 degrees F. can be used. In all cases, it is desirable to prepare and keep the molten melts in steam jacketed equipment to avoid the possibility of localized overheating. Where these precautions are observed, these melts can be heated continuously at a temperature of 325 degrees F. for a period of 24 hours with only relatively slight changes in viscosity, color or other properties. This is sufficient heat stability for all practical purposes.

Paper can be coated with these compositions by any suitable means. The use of a machine using a roll which dips into a pan of the molten coating composition, and after suitable doctoring, transfers this to the paper web by tangential contact is very satisfactory. The excess coating is removed by means of a heated blade or rod and any ridges which are left in the coating by this first blade can be removed by passing the paper over a second heated rod, which may be either stationary or rotating and which gives the coating a smooth, even surface. Or the paper may be coated by dipping into the molten bath and the excess coating scraped off by a suitable arrangement of heated blades and rods. In this case, both sides of the paper are coated simultaneously, but because of the melt temperatures employed, this method is not recommended for excessive heating and dehydration of the paper occur resulting in a brittle sheet. This is avoided to a large extent by the use of a transfer roll.

The temperature at which these melts can be coated depends, mainly, on their ethyl cellulose content which controls their viscosity. This temperature will ordinarily be in the range of 250 degrees to 325 degrees F., but, in some cases where the viscosity is particularly high, temperatures up to 400 degrees F. may be used. In general, it is desirable to coat the melts at the lowest temperature compatible with a workable viscosity, for at the lower temperatures there is less dehydration and embrittlement of the paper, and the coating compositions are also less subject to viscosity and color changes. To avoid this latter possibility due to localized overheating, the pan containing the coating composition should be preferably jacketed and steam heated, or heated by hot oil or other heat transfer agent. Excessive dehydration of the paper can also be avoided by doctoring the coating on the transfer roll so that a minimum of coating is applied to the paper prior to the scraping blades and then, after the scraping blades have removed the excess, chilling the paper and coating as rapidly as possible, consistent with good moistureproofing properties.

The coating weights applied will ordinarily range from one to three pounds per side per ream, although in some instances coating weights of four to five pounds per side per ream (2880 sq. ft.) may be used. From the standpoint of economy, it is desirable to keep the coating weight at the lowest possible value compatible with adequate moistureproofness and heat sealing strength, as well as uniformity and smoothness. This coating weight is about two pounds per ream, but it has been noticed that the gloss and transparency of a coated glassine improve with increasing coating weight up to four pounds per side per ream and, for these reasons, it may be desired to use higher coating weights in some instances.

After the coating is applied and the excess scraped off to the required weight, it is necessary to cool or chill the coating in order to cause it to congeal and set, prior to winding up the paper. The manner or rate of chilling has an effect on the gloss and transparency as well as on the moistureproofness. Molten coating compositions vary considerably as to the chilling methods required for producing optimum results. Some molten coating compositions develop their highest gloss and transparency under very rapid chilling, such as obtained by giving the coated paper a cold water dip immediately after coating; others require slower chilling methods. The coatings of this invention belong to the latter class. While satisfactory results may be obtained with rapid chilling and even with very slow chilling, the best results are obtained when an intermediate rate of chill is used, such as is obtained by allowing the coating to partially air cool before it is brought into contact with the chilling rolls. With these compositions also, cooling by contact with positively cooled chilling rolls gives more satisfactory results than the use of a water dipping method. The cooling rolls are maintained at the proper chilling temperature by the circulation of water at ordinary temperatures or, preferably, at 40 degrees to 60 degrees F.

Even when these coatings are applied to paper by means of a transfer roll, due to the relatively high temperatures employed compared to ordinary wax coatings, some dehydration of the paper occurs resulting in brittle sheet unless this moisture is replaced. If one side is coated at a time, this can be done most conveniently by steaming the sheet or spraying it with a fine water mist on the uncoated side, just prior to wind-up after the coating of the first side. The roll is then preferably allowed to stand an hour or more to permit a uniform diffusion of this added moisture through the sheet. If a slight excess of moisture is added at this point to compensate for that lost when the second side is coated, a finished sheet will be obtained, having the requisite moisture content for commercial wrapping purposes. If both sides are coated simultaneously, the paper should be moistened prior to coating with a sufficient excess to allow for that lost during coating, or after coating, the paper should be rehumidified by passing it through a chamber maintained at a relative humidity of about 85% and a temperature of about 50 degrees C. When glassine is the type of paper being coated it has been found preferable to use a well plasticized type which retains its moisture content better and is easier to rehumidify.

The description so far has had reference, particularly, to the coating of dense, impervious papers such as glassine. These coatings can, of course, be applied to other types of paper as well, such as ordinary sulfite waxing stocks and tissues that develop transparency as a result of impregnation with a coating composition. In this latter case, transparency results from completely filling the voids and impregnating the fibers of the paper with a homogeneous, transparent medium whose refractive index is close to that of cellulose and also from cementing down the surface fibers and giving the surface of the paper a mirror like smoothness. The coatings of this invention can be used to transparentize tissue or a light weight, super calendered paper by impregnation, but, because of the viscous nature of these coating compositions, penetration into the paper is slow. It can be accomplished, however, if an excess of the coating composition is applied to the paper and the coated paper rolled up hot without any chilling. The roll is then allowed to stand in a heated room for an hour or more to allow time for complete saturation of the paper to occur. At the end of this time, the paper is passed through the coating machine again, the excess coating being removed and the remaining coating being smoothed and chilled in the normal way. In this manner, tissues and super calendared sulphite stocks of good transparency, moistureproofness and heat sealing properties can be made.

When applied to both sides of a glassine paper, these coatings give a sheet which is the equal of a lacquer coated glassine in its retention of gloss, transparency and crispness when used to wrap a product high in moisture content such as bread. However, there is considerable buckling or cockling of the sheet just as there is in the case of a lacquered coated glassine, but there is little of the loss of gloss, haziness and sogginess that occur with waxed glassine under the same conditions of use. It has been found that the buckling and cockling can be virtually eliminated or greatly reduced and the general appearance of the sheet, when used on bread, still further improved if, instead of applying the same coating on both sides of the glassine, a coating which is considerably less moistureproof is used on the side which becomes the outside surface of the wrap. In this way, moisture never accumulates in the paper because it can leave more readily than it enters and, consequently, the expansion and shrinkage of the glassine, as a result of changes in its moisture content, are practically eliminated.

In this case, the inside coating supplies the greater part of the moistureproofness of the sheet, with less additional moistureproofness coming from the outside coating. The overall moistureproofness is nevertheless adequate for most purposes when coatings of high moistureproofness such as those disclosed in this invention are used for the inside coating. The outside coating in this case is used, mainly, to enhance the gloss and transparency and to provide heat sealing properties.

For the outside coating, I may use a lacquer such as Du Pont #6326 heat-sealing lacquer, which can be made moistureproof by the addition of two to six per cent paraffin wax based on the solids content. For the purpose here employed, I may use less than two per cent wax based on the solids or no wax at all, so as to reduce its moistureproofness well below that of the inside coating. By thus varying the wax content, the moisture loss can be varied from about two to twenty times that of the inside coating.

Or, for the outside coating, I may use a molten coating composition similar to those already described except that another wax which develops less moistureproofness is substituted for the spermaceti. This wax may be paraffin, beeswax, bleached montan wax, Japan wax, so called amorphous, or microcrystalline paraffin waxes or other waxes. It is possible to obtain quite satisfactory heat sealing coatings of low moistureproofness simply by omitting the spermaceti from the formulas already given, but the addition of other waxes of the soft plasticizing type improves the toughness and heat sealing properties and, particularly in the case of paraffin, the surface slip and non-blocking properties as well.

The formulation of these less moistureproof coatings follows the same general principles as those already outlined for the more highly moistureproof coatings using spermaceti, except that, since high moistureproofness is not now desired, considerably more latitude in formulation is possible. Thus, besides the hard waxes already mentioned, such waxes as carnauba, Rilan wax, F. S. wax (a synthetic wax consisting of hydrogenated mineral oil supplied by Alfred F. Stumph Co., 14 Maiden Lane, New York city), I. G. wax S. (a synthetic wax imported from the I. G. Company by General Dyestuffs Corporation, New York), Glyco wax A. (a synthetic wax made by Glyco Products Company, Brooklyn, N. Y.), Ouricury wax and other waxes can be used. These waxes do not develop high moistureproofness with spermaceti, and for this reason, could not be used in the previous examples given, but they give glossy, hard, transparent and heat-sealing coatings and are, therefore, well suited for the coating on the outside surface.

The proportions of the various ingredients in these coatings can be varied over a wider range than is possible for the moistureproofing type of coating and the limiting ranges of composition are given below.

|  | Operative range |
|---|---|
| Hard wax | 0–75 |
| Resin | 0–80 |
| Plasticizing wax | 0–50 |
| Ethyl cellulose | 4–30 |

In order to better describe the compositions that might be used, I will now give further examples which are illustrative only and not limitative, for many other embodiments are possible and will be suggested by this disclosure to those skilled in the art.

Example 8

|  | Per cent by weight |
|---|---|
| Opal wax | 60 |
| Hydrogenated ester gum | 25 |
| Ethyl cellulose (low viscosity) | 15 |
|  | 100 |

Example 9

|  | Per cent by weight |
|---|---|
| Opal wax | 45 |
| Hydrogenated ester gum | 30 |
| Paraffin | 10 |
| Ethyl cellulose (low viscosity) | 15 |
|  | 100 |

Example 10

|  | Per cent by weight |
|---|---|
| Opal wax | 45 |
| Hydrogenated ester gum | 20 |
| Bleached beeswax | 20 |
| Ethyl cellulose (low viscosity) | 15 |
|  | 100 |

Example 11

|  | Per cent by weight |
|---|---|
| Carnauba | 30 |
| Ester gum | 35 |
| Paraffin | 5 |
| Bleached beeswax | 15 |
| Ethyl cellulose | 15 |
|  | 100 |

The above examples will give coatings in all respects similar to those given by Examples 1–7, so far as gloss, transparency, flexibility, hardness, non-tackiness, non-smearing, non-blocking and heat sealing properties are concerned, but their moisture loss will generally exceed the maximum value of 500 grams per 10,000 sq. in. per 24 hours at 85 degrees F. given for these other compositions. For the purpose here employed, however, the moisture permeability need not necessarily exceed the value of 500 grams per 10,000 sq. in. per 24 hours at 85 degrees F. but to overcome the buckling and distortion of the paper when used on bread, it suffices if the outside coating is two, three or more times more permeable than the coating on the inside surface.

These coating compositions have been described with particular reference to their use on paper, but their high degree of transparency makes them well suited for use on such transparent wrapping tissues as Cellophane or regenerated cellulose, cellulose acetate sheeting, Pliofilm, which is a transparent film made from resinified rubber, gelatine and casein sheets and, in general, any type of transparent wrapping materials.

It is to be noted that where two coatings are used for the different sides of the base sheet, each coating embodies the essential characteristics of the present invention i. e., the compounding of ethyl cellulose and the hard wax and plasticizing ingredients as soft wax as set forth. It being desirable to confer a particularly high moistureproofness to the coating that comes next to the article being wrapped spermaceti is embodied. On the other side of the sheet where there is not the necessity for this particularly high moistureproofness, a softer wax or resin plasticizer may be used in place of the spermaceti.

It is to be noted that Rylan wax referred to in the specification is a synthetic hard wax made by the E. I. du Pont Company and may be described as essentially hydrogenated castor oil and that Ouricury is a naturally hard vegetable wax.

I claim:

1. An article of manufacture comprising a base sheet coated with a moistureproof and heat-sealable coating comprising from 30% to 50% of a hard wax, from 10% to 30% spermaceti, and from 14% to 22% of a cellulose ether.

2. An article of manufacture comprising a base sheet coated with a moistureproof and heat-sealable coating comprising from 30% to 50% of a hard wax, from 10% to 30% spermaceti, resin, and from 14% to 22% of a cellulose ether.

3. The method of preparing transparent moistureproof materials which comprises impregnating a thin tissue paper with an excess of a molten composition comprising from 30% to 50% of a hard wax, from 10% to 30% spermaceti, and from 14% to 22% of a cellulose ether; winding the paper up while the coating is hot, maintaining an elevated temperature in said paper for a sufficient time for the molten composition to saturate the paper, removing the excess coating, and smoothing and chilling the coating to produce a moistureproof and heat-sealable sheet that is also glossy and transparent.

4. The method of preparing transparent moistureproof materials which comprises impregnating a thin tissue paper with an excess of a molten composition comprising from 30% to 50% of a hard wax, from 10% to 30% spermaceti, resin, and from 14% to 22% of a cellulose ether; winding the paper up while the coating is hot, maintaining an elevated temperature in said paper for a sufficient time for the molten composition to saturate the paper, removing the excess coating, and smoothing and chilling the coating to produce a moistureproof and heat-sealable sheet that is also glossy and transparent.

5. The method of preparing transparent moistureproof materials which comprises impregnating a thin, supercalendared paper with an excess of a molten composition comprising from 30% to 50% of a hard wax, from 10% to 30% spermaceti, and from 14% to 22% of a cellulose ether; winding the paper up while the coating is hot, maintaining an elevated temperature in said paper for a sufficient time for the molten composition to saturate the paper, removing the excess coating, and smoothing and chilling the coating to produce a moistureproof and heat-sealable sheet that is also glossy and transparent.

6. The method of preparing a transparent moistureproof material which comprises impregnating a thin supercalendared paper with an excess of a molten composition comprising from 30% to 50% of a hard wax, from 10% to 30% spermaceti, a resin, and from 14% to 22% of a cellulose ether; winding the paper up while the coating is hot, maintaining an elevated temperature in said paper for a sufficient time for the molten composition to saturate the paper, removing the excess coating, and smoothing and chilling the coating to produce a moistureproof and heat-sealable sheet that is also glossy and transparent.

7. A moistureproof and heat-sealable wrap suitable for articles high in moisture content and having an inside and an outside surface, the wrap comprising a coated glassine paper coated on its inside surface with a coating composition of from 30% to 50% of a hard wax, from 10% to 30% spermaceti, and from 14% to 22% of a cellulose ether; and having a less moistureproof coating on the opposite or outside surface of the paper.

8. A moistureproof and heat-sealable wrap suitable for articles high in moisture content and having an inside and an outside surface, the wrap comprising a coated glassine paper coated on its inside surface with a coating composition of from 30% to 50% of a hard wax, from 10% to 30% spermaceti, resin, and from 14% to 22% of a cellulose ether; and having a less moistureproof coating on the opposite or outside surface of the paper.

9. A moistureproof and heat-sealable wrap suitable for articles high in moisture content comprising a coated glassine paper coated on one surface with a coating composition of from 30% to 50% of a hard wax, from 10% to 30% spermaceti, and from 14% to 22% of a cellulose ether; and a less moistureproof coating on the opposite surface of the paper comprising a hard wax, a plasticizing wax and a cellulose ether.

10. A moistureproof and heat-sealable wrap suitable for articles high in moisture content comprising a coated glassine paper coated on one surface with a coating composition of from 30% to 50% of a hard wax, from 10% to 30% spermaceti, resin, and from 14% to 22% of a cellulose ether; and a less moistureproof coating on the opposite surface of the paper comprising a hard wax, a plasticizing wax, and a cellulose ether.

11. A moistureproof and heat-sealable wrap suitable for articles high in moisture content and having an inside and an outside surface, the wrap comprising a coated glassine paper coated on its inside surface with a coating composition of from 30% to 50% of a hard wax, from 10% to 30% spermaceti, and from 14% to 22% of a cellulose ether; and a coating on the opposite or outside surface of the paper comprising a less moistureproof and heat-sealing nitro-cellulose lacquer.

12. A moistureproof and heat-sealable wrap suitable for articles high in moisture content and having an inside and an outside surface, the wrap comprising a coated glassine paper coated on its inside surface with a coating composition of from 30% to 50% of a hard wax, from 10% to 30% spermaceti, resin, and from 14% to 22% of a cellulose ether; and a coating on the opposite or outside surface of the paper comprising a less moistureproof and heat-sealing nitro-cellulose lacquer.

JOHN P. SERMATTEI.